United States Patent [19]

Levine

[11] Patent Number: 4,946,005

[45] Date of Patent: Aug. 7, 1990

[54] APPARATUS AND METHOD FOR CHARGING A LUBRICANT INTO A MARINE ENGINE OUTDRIVE

[76] Inventor: Paul A. Levine, 1550 S. Highland Ave., Ste. B, Clearwater, Fla. 34616

[21] Appl. No.: 407,834

[22] Filed: Sep. 15, 1989

[51] Int. Cl.$^5$ .............................................. F16N 3/06
[52] U.S. Cl. ...................................... 184/28; 184/1.5; 184/105.1; 184/105.3
[58] Field of Search ....................... 184/1.5, 28, 105.1, 184/105.2, 105.3

[56] References Cited

U.S. PATENT DOCUMENTS

| | | | |
|---|---|---|---|
| 940,572 | 11/1909 | Agner | 184/105.2 |
| 2,425,692 | 8/1947 | Clapp | 184/105.1 |
| 3,236,268 | 2/1966 | Simpson | 184/1.5 |
| 3,307,598 | 3/1967 | Lowenthal | 141/330 |
| 3,720,287 | 3/1973 | Martel | 184/1.5 |
| 3,795,262 | 3/1974 | Post | 141/382 |
| 3,858,686 | 1/1975 | Luterick | 184/1.5 |
| 4,033,432 | 7/1977 | Bernstein | 184/1.5 |
| 4,589,626 | 5/1986 | Kurtz et al. | 251/10 |
| 4,756,349 | 7/1988 | Atkins | 184/1.5 |

FOREIGN PATENT DOCUMENTS 0178415  3/1962  Sweden .................... 184/105.1

Primary Examiner—Ira S. Lazarus
Assistant Examiner—Alan B. Cariaso
Attorney, Agent, or Firm—Joseph C. Mason, Jr.; Ronald E. Smith

[57] ABSTRACT

An apparatus that facilitates the filling of a marine engine lower unit reservoir with gear lube. A squeezable container having a conical spout with a threaded base is modified by cutting off a substantial part of the spout, leaving only a truncated, unthreaded part above the threaded base. The threads at the base of the spout engage complementally formed threads in a fitting member having an axial bore disposed in fluid communication with a first end of an elongate flexible tube that carries a clamp member operable to selectively open and close the tube to fluid flow. The opposite end of the tube is confluent with an axial bore formed in another fitting that is adapted to engage either a drain opening or a vent opening in a lower unit. The lower unit is filled by elevating and inverting the squeezable gear lube container when the clamp is open and the proper fitting is engaged with the drain opening. The clamp is closed when an empty tube is removed and a new squeezable tube is engaged with the fitting having the swivel head. The clamp is reopened and the process is repeated until the required amount of gear lube has been introduced into the engine outdrive. The same apparatus also has utility in connection with draining and flushing the lubrication reservoir.

13 Claims, 4 Drawing Sheets

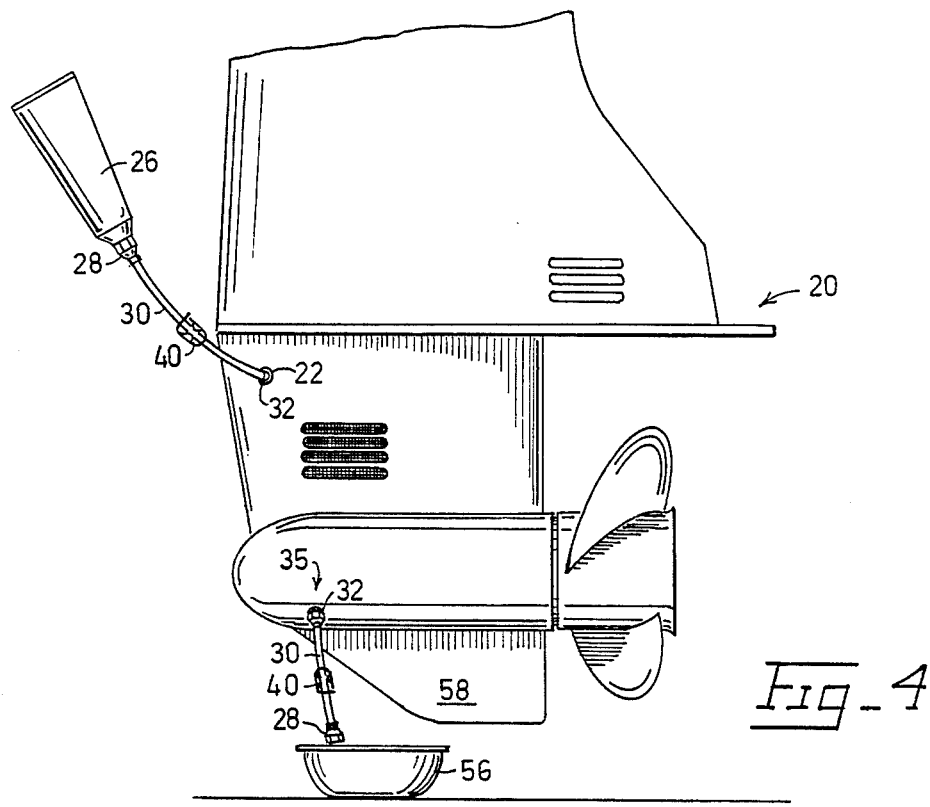
Fig_4
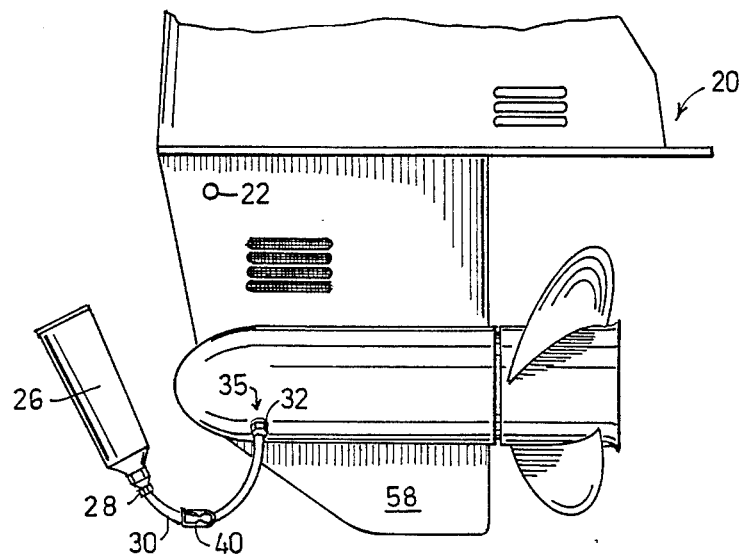
Fig_5

APPARATUS AND METHOD FOR CHARGING A LUBRICANT INTO A MARINE ENGINE OUTDRIVE

TECHNICAL FIELD

This invention relates, generally, to a device that facilitates the charging of a lubricant into a marine engine lower unit housing reservoir More particularly, it relates to an apparatus that enables the charging to be accomplished in the absence of modification to the structure of the lower unit.

BACKGROUND ART

Marine engines having outboard or inboard/outboard drive units typically include lower unit housings that house parts such as a propeller shaft, bearings, a bearing currier, seals and the like. The interior cavity of the housing within which such parts are positioned defines a reservoir for lubricant. Thus, when the reservoir is fully charged with a lubricant, the parts housed in the lower unit are immersed in the lubricant and their useful working life is thereby extended.

The lubricant specified for use in such engines is sold to consumers in ten ounce squeeze tubes having conical spouts with threads at the base thereof. To charge the lubricant into a lower unit, a vent near the engine housing is opened, and a drain plug at the bottom of the lower unit is removed; this allows the lubricant, also known as gear lube, to drain from the reservoir Next, the conical spout of the squeeze tube is cut, the spout is inserted into the uncapped drain opening, and the tube is squeezed.

It is important to note that engine manufacturer's require that the gear lube be charged into the lower unit reservoir from the bottom thereof, i.e., the gear lube must be introduced through the uncapped drain opening. If the drain plug is reinstalled after the old gear lube is drained from the reservoir, and the gear lube introduced into the vent opening vertically spaced thereabove, the outdrive gears can be damaged due to trapped air pockets and all engine warranties are voided.

Thus, the reservoir must be filled from the bottom thereof. Accordingly, after the first tube of gear lube has been introduced thereinto, the individual handling the lube-changing procedure must remove the conical spout of the squeeze tube from the drain opening and quickly cover the opening before the newly introduced gear lube can drain out. The spout of a second tube must then be cut off with a first hand while a second hand remains occupied with plugging the drain opening. The drain opening must then be uncovered and the spout of the second tube quickly inserted thereinto to again prevent unwanted draining of fresh gear lube. Since a typical lower unit reservoir holds the contents of about four tubes, this cumbersome procedure must be repeated until the reservoir is finally filled. The drain plug must be quickly reinstalled after the last tube has been emptied.

Unfortunately, it is not possible to fully empty a gear lube squeeze tube when the above-described procedure is followed, primarily because only one hand is available to perform the tube-squeezing function. The other hand must apply upward pressure to keep the tube seated in the drain opening. Experience has shown that two to four ounces of gear lube in each ten ounce tube is left within each tube because only one hand is available to squeeze it. Thus, a boat owner will waste the equivalent of one full tube for every four or five ten ounce squeeze tubes used.

Commercial marine engine maintenance operations do not employ the inefficient technique just described. Instead, the gear lube is pumped from a fifty-five gallon drum into the lower unit lubrication reservoir, thereby completely avoiding the use of individual squeeze tubes and the awkward and inefficient method of emptying them.

However, individual boat owners who prefer to do their own routine maintenance normally do not have access to fifty-five gallon drums of gear lube, nor do they typically own the pump and other equipment used by commercial operators.

Accordingly, a number of inventors have tried to develop devices that facilitate the use of squeeze tubes. For example, U.S. Pat. No. 3,955,648 to Walker discloses a fitting that replaces the drain plug supplied by the marine manufacturer, and the new fitting is specifically configured to facilitate the introduction of gear lube into the reservoir. However, most marine engine manufacturers will void their warranty if parts of the engine are replaced or modified. Moreover, the Walker fitting is not universal and has utility only in connection with drain openings of large diameters. Engine outdrives having small diameter drain openings, such as those manufactured by Nissan Corporation, cannot accept the Walker fitting An apparatus having utility in high pressure systems is shown in U.S. Pat. No. 3,795,262 to Post.

Other U.S. patents of interest include U.S. Pat. No. 3,976,110 to White, U.S. Pat. No. 3,647,024 to Wick, U.S. Pat. No. 2,016,809 to Bystricky, U.S. Pat. No. 4,589,626 to Kurtz, U.S. Pat. No. 3,942,228 to Buckman, U.S. Pat. No. 2,995,214 to Sensui, and U.S. Pat. No. 3,307,598 to Lowenthal.

DISCLOSURE OF INVENTION

The novel apparatus includes a first externally threaded part or fitting that screw threadedly engages the internally threaded drain opening of a conventional lower unit, and a second swivelly mounted internally threaded part or fitting that screw threadedly engages the external threads formed at the base of a modified squeeze tube spout. The first and second fittings are interconnected by a transparent flexible tube member, and a normally open valve means, operable with one hand, is carried by the tube member. When squeezed, the valve means pinches the tubular member and blocks lubricant flow therethrough; when released, the valve means returns to its normally open configuration and fluid communication is restored between the two fittings.

As a preparatory step to the use of the novel apparatus, a conventional ten ounce gear lube squeeze tube is modified by cutting off its elongate conical spout about a ¼ inch above the threads.

To change gear lube using the novel device, the dirty gear lube may be drained in the conventional manner, i.e., by removing the drain plug and opening the vent. However, conventional draining is messy because the gear lube exits the drain opening and runs along the skeg of the lower unit to the lowest point of the skeg before falling into a collection container. The skeg must then be cleaned. Due to the inherent lubricating qualities of gear lube oil, it is very difficult to remove it from any surface.

The messy draining procedure of the prior art is obviated by use of the novel apparatus, as will be set forth in the detailed description that follows.

Once draining has been completed, it is advisable to flush the lower unit to completely remove the dirty gear lube before recharging the lower unit's reservoir. Heretofore, it has been difficult to accomplish the flushing because the elongate tips of the gear lube squeeze tubes are too large to easily permit their insertion into the upper vent opening. As will be made clear in the description that follows, the novel apparatus also facilitates the flushing procedure.

After draining and flushing, the external threads of the modified gear lube squeeze tube are engaged with the internal threads of the internally threaded swivel-headed fitting part of the novel apparatus, and the external threads of the externally threaded part of the novel apparatus are engaged with the internal threads of the drain opening. The first gear lube-containing squeeze tube is then squeezed completely empty, since both hands are now available to accomplish the task. The flexible plastic flow cutoff clamp is then squeezed so that the elongate tube that interconnects said fittings is pinched and therefore closed to fluid communication. A second gear lube-containing squeeze tube is then engaged to the internally threaded swivel-headed fitting, the clamp is opened to re-establish fluid communication between the squeeze tube and the drain opening, and the process is repeated until the gear lube reservoir has been filled to its recommended level. The vent opening is then re-capped, the apparatus removed and the drain re-capped.

The primary object of this invention is to provide an apparatus that enables individual boat owners to change gear lube in a quick, clean and efficient manner.

A related object is to provide a novel apparatus that also facilitates the draining of dirty gear lube from a lower unit reservoir.

Still another object is to provide an apparatus that facilitates the flushing of a gear lube reservoir after dirty gear lube has been drained therefrom.

Yet another object is to provide an apparatus that insures that gear lube-containing squeeze tubes can be completely emptied so that gear lube is not wasted.

The invention accordingly comprises the features of construction, combination of elements and arrangement of parts that will be exemplified in the construction set forth hereinafter and the scope of the invention will be set forth

DESCRIPTION OF THE DRAWINGS

For a fuller understanding of the nature and objects of the invention, reference should be made to the following detailed description, taken in connection with the accompanying drawings, in which:

FIG. 4 is a view showing the novel apparatus being used to flush the lower unit after draining and prior to re-charging the lower unit with clean gear lube; and FIG. 5 is a side elevational view of a marine lower unit showing the novel apparatus in its gear lube-charging disposition.

BEST MODES FOR CARRYING OUT THE INVENTION

Figure 1:
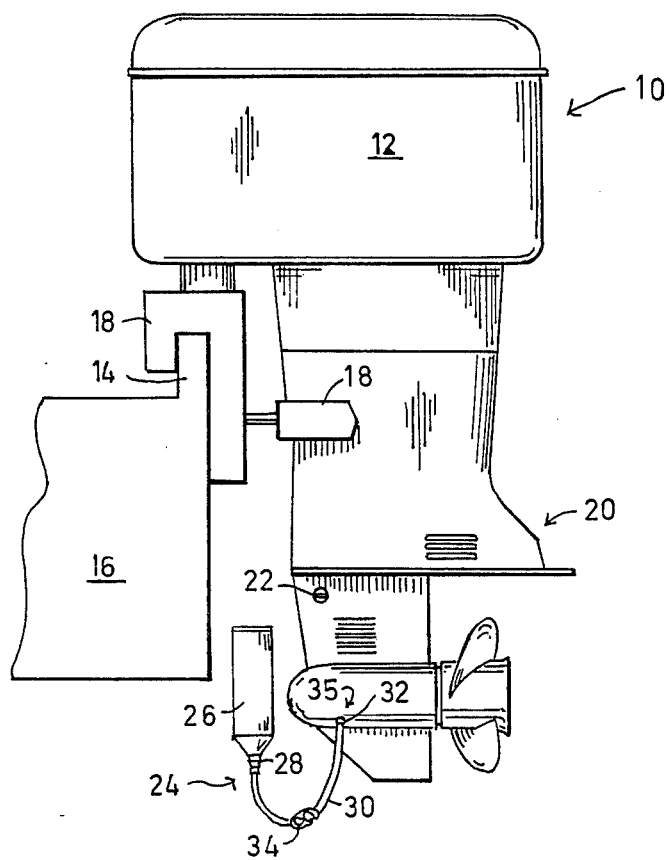
FIG. 1 is a side elevational view of a typical marine engine, showing the novel apparatus connected to the drain opening in the lower unit.

Referring now to FIG. 1, it will there be seen that an illustrative embodiment of the invention is denoted as a whole by the reference numeral 10. Embodiment 10 includes an outboard motor 12, although it should be understood that the invention to be described has equal utility in connection with inboard/outboard motors as well. Motor 12 is mounted to the transom 14 of a boat 16 by a motor mount 18. The lower unit of the motor 12 is denoted 20 as a whole. A vent screw 22 is shown in the upper part of the lower housing. The novel assembly of the invention is denoted in FIG. 1 by the reference numeral 24 and includes a squeeze tube 26, second swivel-headed fitting 28 disposed in screw threaded engagement therewith, an elongate, preferably transparent tube member 30, first fitting 32 and a clamp member 34 that is carried by tube 30. Fitting 32 is depicted in screw threaded relation to drain opening 35, it being understood that the drain plug (not shown) has been removed so that the drain opening 35 may accept fitting 32 as depicted.

Figure 2:
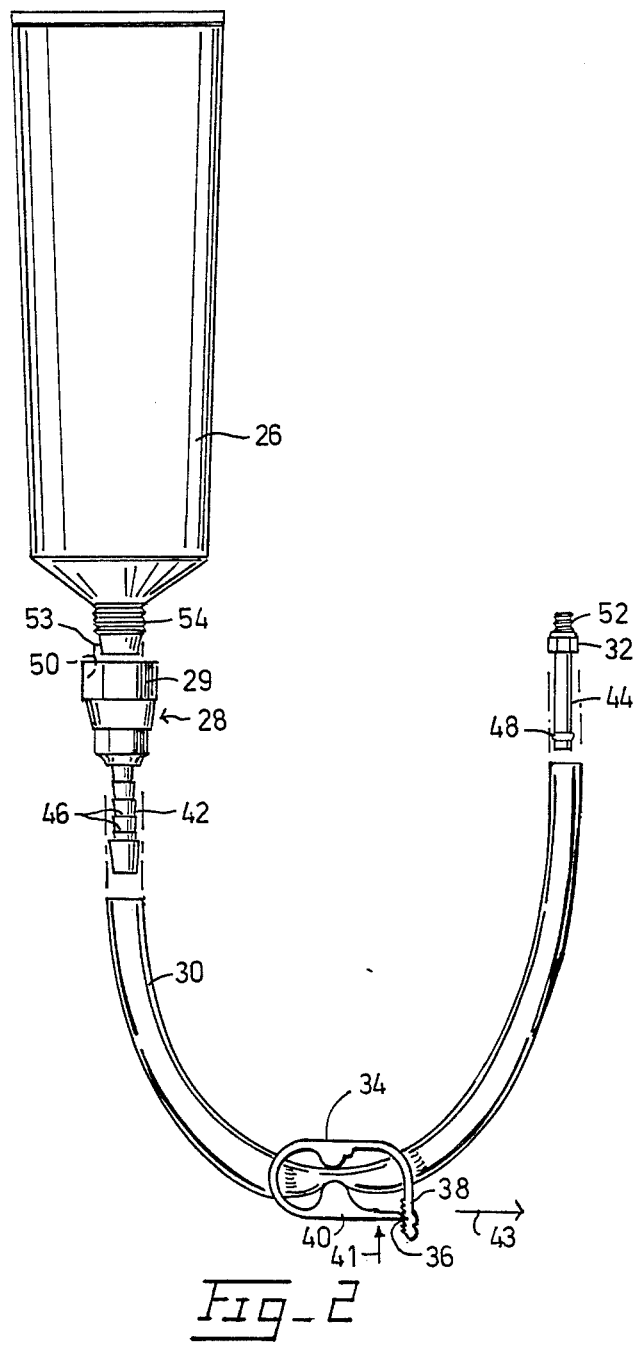
FIG. 2 is a side elevational, exploded view of the parts of the novel apparatus.

Apparatus 24, to be known commercially as the Lube Tube, is shown in greater detail in FIG. 2. It should be understood that each fitting 28, 32 is provided with an axial bore so that lubrication squeezed from the squeeze tube 26 may flow through flexible tube 30 and be ejected from fitting 32 into the lubrication reservoir of engine 12 when the invention is used in the manner to be described.

Flexible plastic clamp member 34 having ratchet teeth 36 formed on flexible detent member 38 and a thumb-operable pawl member 40 is carried by tube 30 as shown and is operable to selectively open and close the fluid passageway provided by tube 30. Tube 30 is closed to fluid communication when pawl 40 is displaced in the direction of directional arrow 41; the tube is opened by displacing detent member 38 in the direction indicated by directional arrow 43.

Each fitting 28, 32 includes an integral boss part 42, 44, respectively, that is axially received within an associated end of tube 30. Anti-retraction annular ridges 46, 48 are formed in bosses 42, 44, respectively, to prevent facile retraction of the fittings from their associated opposite ends of tube 30.

Importantly, squeeze tube 26, which is commercially provided with a tapered spout, is modified by cutting said spout about ¼ inch above the existing threads as shown; thus, truncated spout 53 remains.

Fitting 28 is provided with internal threads 50 and includes a swivel head design, i.e., hex head 29 rotates independently of boss 42. This assists the operator in connecting and disconnecting the lube tube when fitting 32 is attached to the lower unit. Moreover, fitting 28 includes an internal seat, not shown, that accepts truncated spout 53, when internal threads 50 engage external threads 54. Thus, the distal end of truncated spout 53 tightly engages the internal seat and gear lube cannot leak from fitting 28 when it is secured properly.

Fitting 32 is externally threaded as at 52 and need not be of swivel head design.

Figure 3:
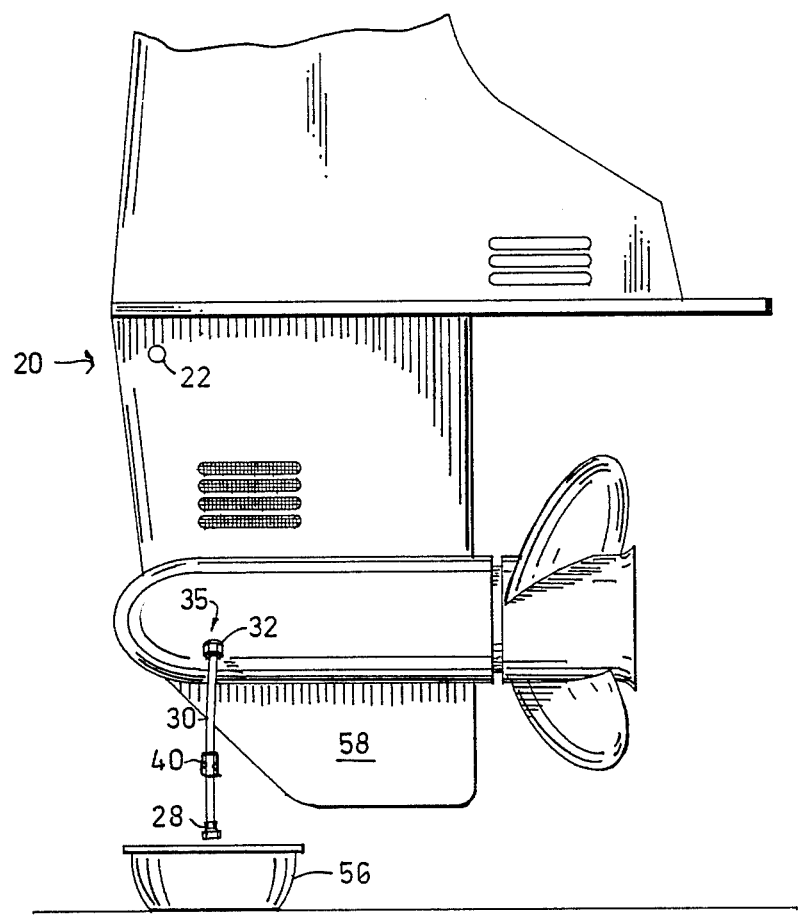
FIG. 3 is a side elevational view of a marine engine lower unit showing the novel apparatus in use to facilitate the draining of dirty gear lube from the lower unit.

Referring now to FIG. 3, to drain gear lube from the gear lube reservoir within the lower unit 20, the drain plug is removed from drain opening 35 while vent screw 22 is left in place; atmospheric pressure will prevent draining of the gear lube as long as the vent is closed by screw 22.

External threads 52 of fitting 32 are then brought into screw threaded relation to the internally threaded drain opening 35. Fitting 28 is positioned above a receptacle 56 for collecting used gear lube and clamp 40 is opened by pushing forwardly on retainer 38. In this manner, the gear lube is directed into the receptacle 56 and cleaning of the skeg 58 is avoided.

As shown in FIG. 4, flushing may be accomplished by attaching a squeeze tube 26 of gear lube to fitting 28 and inserting the externally threaded part 52 of fitting 32 into the vent opening 22. The flushing gear lube is routed directly into the collection receptacle 56 by the second drain tube 30.

Recharging the lower unit reservoir is accomplished by connecting external threads 54 of squeeze tube 26 to the internal threads 50 of fitting 28, engaging threads 52 of fitting 32 to drain opening 35, and squeezing the tube 26 until completely empty, as depicted in FIG. 5. Elevation and inversion of tube 26 as depicted in FIG. 5 facilitates the tube emptying process and completely empties the tube. The amount of elevation, preferably, would be greater than that shown. Once the first tube 26 is empty, clamp 40 is closed to prevent back flow until a second tube is attached to fitting 28. The clamp is again opened and so on until the reservoir is filled to the recommended level.

Vent 22 is then closed, fitting 32 is removed from its connection to the drain opening 35 and the drain plug is reinstalled.

Although no dimensions or parts are critical, the commercial embodiment of the Lube Tube is about twelve inches in length; tube 30 alone is about ten inches in length and is preferably 5/16 inch outside diameter (¼ inch inside diameter) plastic tubing. Fitting 28 is a specially machined ¼ inch×9/16-18 JIC swivel stem, and fitting 32 is a specially machined ⅜ inch - 16 thread 0-ring boss fitting. Both fittings must be specially machined because they are not commercially available, i.e., they are not sold over the counter.

It will thus be seen that the objects set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described,
What is claimed is:

1. An apparatus having utility in connection with the introduction of a lubricating fluid into a reservoir therefor which reservoir requires charging from the bottom thereof, comprising:
    a first axially bored, externally threaded fitting adapted to releaseably and selectively engage a drain opening and a vent opening confluent with said reservoir;
    a second axially bored, internally threaded fitting adapted to releasably engage an externally threaded spout of a squeezable container for lubrication;
    an elongate, flexible tube member disposed in interconnecting relation between said first and second fittings so that the respective axial bores thereof are in fluid communication with one another;
    a valve means for selectively opening and closing said tube member to fluid flow therethrough;
    whereby clean lubricating fluid is introduced into said reservoir by screw threadedly engaging said first fitting to said drain opening, by screw threadedly engaging said second fitting to said spout of said squeezable container and by driving said fluid through said tube member and into said reservoir by squeezing said squeezable container;
    whereby draining dirty lubricating fluid from said reservoir as a preparatory step to charging clean fluid into said reservoir is accomplished by engaging said first fitting to said drain opening, positioning said second fitting in open communication with a receptacle for the collection of dirty fluid, and opening a vent so that dirty fluid flows out of said drain opening, through said tube and into said receptacle; and
    whereby the reservoir is flushed after draining as a further preparatory step to charging said reservoir with clean fluid, and accomplishing said flushing by positioning the first fitting into fluid communication with said drain opening, positioning said second fitting in open communication with said receptacle, preparing a second assembly of parts consisting of an elongate flexible tube having fittings at its opposite ends and charging the contents of a squeezable lubricating fluid container into said vent opening so that said contents passes through said reservoir and into said receptacle to thereby flush said reservoir.

2. The apparatus of claim 1, wherein said first fitting further includes an axially extending boss means integral to said screw threaded part.

3. The apparatus of claim 2, further comprising at least one annular raised ridge formed in said boss means transverse to a longitudinal axis of said boss means.

4. The apparatus of claim 3, wherein said boss means is axially received within a first end of said tube member and held against facile retraction thereof by said at least one raised ridge.

5. The apparatus of claim 4, wherein said second fitting further includes an axially extending boss means integral to its screw threaded part.

6. The apparatus of claim 5, further comprising at least one annular raised ridge formed in said second fitting boss means transverse to a longitudinal axis of said second fitting boss means.

7. The apparatus of claim 6, wherein said second fitting boss means is axially received within a second end of said tube member and held against facile retraction thereof by said at least one raised ridge.

8. An apparatus having utility in connection with the draining, flushing and re-filling of a reservoir for a lubricant of the type that requires filling at a drain opening thereof when a vent opening thereof is open, comprising:
    an elongate, flexible tubing having a predetermined length;
    a first axially bored fitting being tightly secured to a first end of said tubing;

a second axially bored fitting being tightly secured to a second end of said tubing;

said second fitting having a swivel head;

a normally open flexible clamp means being carried by said tubing and being operable to pinch said tubing when closed to prevent fluid flow therethrough;

said first fitting being externally threaded to selectively screw threadedly engage a vent opening and a drain opening;

said second fitting being internally threaded to screw threadedly engage an externally threaded spout of a lubricant container of the squeeze tube type;

whereby squeezing said lubricant container forces lubricant into said second fitting, through said tubing, and out said first fitting into said vent opening when said first fitting is engaged with said vent opening and into said drain opening when said first fitting is engaged with said drain opening.

9. The apparatus of claim 8, wherein said first and second fittings each have axially extending boss members that are tightly slideably received within said opposite ends of tubing to retain their respective fittings thereto.

10. The apparatus of claim 9, wherein transversely disposed annular raised ridges are formed on said boss members of said first and second fittings to defeat facile separation of said fittings from said tubing.

11. A method of charging gear lube into a gear lube reservoir of a marine engine outdrive, comprising the steps of:

modifying a gear lube container of the squeezable type that has a conical spout and a threaded base by truncating the spout at a preselected point above said threaded base;

removing a drain plug of said reservoir;

connecting a first fitting member to a drain opening of said reservoir;

connecting an elongate flexible tube member to said first fitting member;

connecting a second fitting member to an opposite end of said flexible tube member;

connecting the threaded base of said spout to said second fitting member;

opening a vent opening formed in said gear lube squeezing said container to force gear lube therefrom into said reservoir;

closing said flexible tube member to fluid flow after said container has been at least substantially emptied; disconnecting said threaded base of said spout and said second fitting member;

modifying an additional gear lube container of the same type in the same way and connecting the threaded base of its spout to said second fitting;

opening said tube member to fluid flow;

squeezing said second gear lube container until it is at least substantially empty; and repeating the preceding five steps.

12. The method of claim 11, further comprising the step of draining dirty gear lube from said reservoir as a preparatory step to charging clean gear lube into said reservoir in accordance with the steps of said claim 11, and accomplishing said draining by connecting said first and second fitting members to opposite ends of the flexible tube member, engaging said first fitting member to said drain opening, positioning said second fitting member in open communication with a receptacle for the collection of dirty gear lube, and opening a vent screw so that dirty gear lube flows out said drain opening, through said flexible tube and into said receptacle.

13. The method of claim 12, further comprising the step of flushing the reservoir after draining it in accordance with the steps of claim 12 as a further preparatory step to charging said reservoir with clean gear lube, and accomplishing said flushing by leaving the first fitting member in fluid communication with said drain opening and by leaving said second fitting member in open communication with said receptacle, and preparing a second assembly of parts consisting of an elongate flexible tube having fittings at its opposite ends and charging the contents of a squeezable gear lube container into said vent opening by following the steps of claim 11 so that said contents passes through said reservoir and into said receptacle to thereby flush said reservoir.

* * * * *